Sept. 23, 1969  L. H. LARSON  3,468,067
APPARATUS FOR USE IN GRINDING LENSES
Filed Feb. 13, 1967  4 Sheets-Sheet 1

INVENTOR.
LAWRENCE H. LARSON
BY
ATTORNEY

Sept. 23, 1969  L. H. LARSON  3,468,067
APPARATUS FOR USE IN GRINDING LENSES
Filed Feb. 13, 1967  4 Sheets-Sheet 2

INVENTOR.
LAWRENCE H. LARSON
BY Roger L. Martini
ATTORNEY

Sept. 23, 1969 L. H. LARSON 3,468,067
APPARATUS FOR USE IN GRINDING LENSES
Filed Feb. 13, 1967 4 Sheets-Sheet 3

INVENTOR.
LAWRENCE H. LARSON
BY
ATTORNEY

Sept. 23, 1969  L. H. LARSON  3,468,067
APPARATUS FOR USE IN GRINDING LENSES
Filed Feb. 13, 1967  4 Sheets-Sheet 4
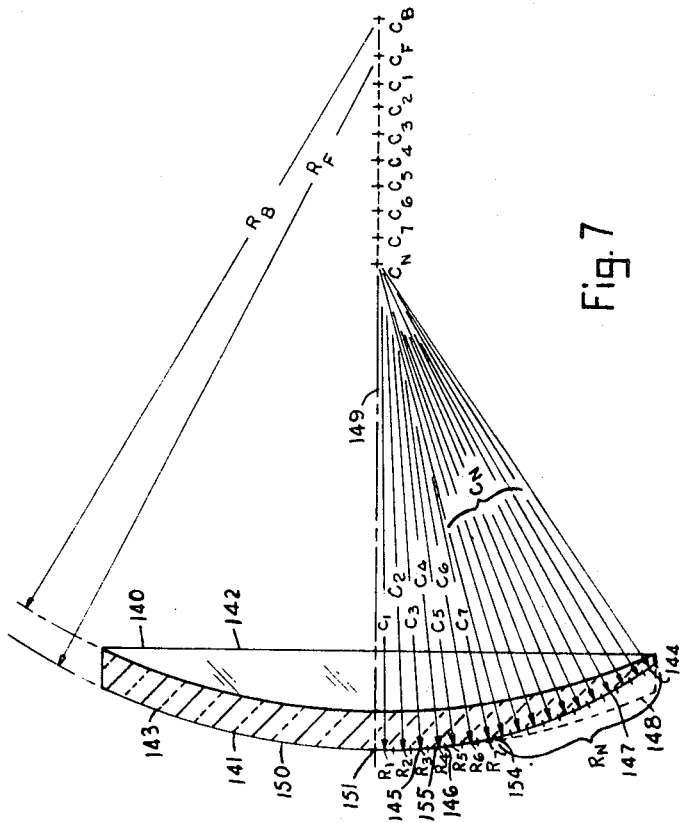
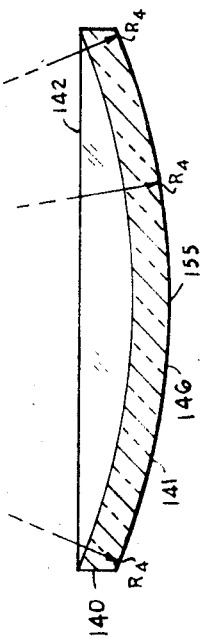
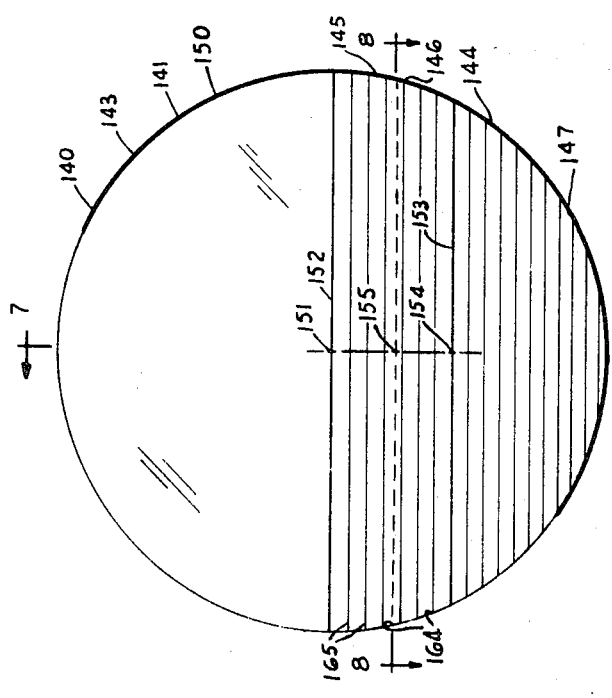
INVENTOR.
LAWRENCE H. LARSON
BY Roger L. Martin

United States Patent Office 3,468,067
Patented Sept. 23, 1969

3,468,067
APPARATUS FOR USE IN GRINDING LENSES
Lawrence H. Larson, 1612 Don San George Court,
Orlando, Fla. 32806
Filed Feb. 13, 1967, Ser. No. 615,698
Int. Cl. B24b 9/14
U.S. Cl. 51—96     10 Claims

ABSTRACT OF THE DISCLOSURE

An apparatus for use in grinding opthalmic lens is provided. It includes a grinding wheel and a machine used for orienting and manipulating a refractive body with respect to the cutting surface of the wheel. In the process of developing an optical surface through use of the apparatus, a plurality of narrow, adjacently arranged cuts are made in the surface of the refractive body. The respective cuts are made in parallel planes and the machine is provided with certain mechanisms that are adjustable and enable development through use of the apparatus of optical surfaces that provide a progressively varying dioptric power in the finished lens.

Featured in the machine is a carriage supported lens holder which is pivotally moved about one axis when the cut is made in the refractive body and which is rotatably adjustable about another axis to facilitate adjustment of the refractive body relative to the grinding surface between successive cuts. Also provided are mechanisms for precisely adjusting the location of the lens with respect to the pivot axis and for moving the carriage toward and away from the grinding surface al lto facilitate attainment of cuts having different radii of curvature.

Background of the invention

This invention relates to an opthalmic lens grinding apparatus and in particular relates to one which may be used in the development of optical surface areas that provide a progressively varying dioptric power in the finished lens as well as surface areas that provide a constant dioptric power in the finished lens.

In the most common types of multi-focal lens, the separate fields of constant dioptric power join along a line characterized by a dirt collecting ridge or ledge. As the fixation axis of the user shifts from one field to the next, the image appears to jump because of the abrupt change in dioptric power which is experienced as the line of sight crosses the juncture of the fields. This is objectionable and a source of considerable discomfort to many people requiring corrective lens.

Lens that have a field of progressively varying dioptric power have been known, for many years, but up until recently they have not been available to optical laboratories for use in grinding prescription lens. In such lens, the fields of constant dioptric power, e.g. the near and far fields, are separated by an intermediate field that has a dioptric power that varies progressively from one edge of one field of constant dioptric power to the edge of the next field of dioptric power. With this intermediate field, the dirt collecting field is avoided and the abrupt change in dioptric power as the fixation axis shifts from one field of constant dioptric power to the next is also avoided. Instead, the change is progressive with the shift and hence is less noticeable to the user.

Certain objections to the newer lens nevertheless exist and the main objection is to the distortion in the image which is experienced when the fixation axis shifts to the lateral areas of the field of progressively varying power. These distortions are caused by deviations in the centers of curvature at various points in the optical surface area from an axis common to the curvatures at other points in the area and also to lack of uniform spherical power in directions transverse of the principal axis of the progressive field of varying dioptric power.

It is believed that the apparatuses currently used in grinding optical surface areas having a progressively varying curvature in one meridian can only approximate the desired curvatures in the directions transverse of the meridian and hence there is a need for an apparatus that can be used in developing such desired surfaces.

In the past many different methods have been proposed for developing optical surfaces that have a progressively varying curvature and included among the proposals is a method which involves the cutting of a plurality of infinitely narrow and adjacently arranged cuts in the surface of a refractive body and wherein each cut has a curvature intermediate that of the adjacent cuts. Such a proposal has merit for use in developing optical surfaces of progressively varying curvature but to date no machine capable of manipulating a refractive body with respect to an abrasive surface of a lens grinding implement so as to permit use of the proposed method has appeared on the market, and the applicant is unaware of any proposed apparatus permitting use of the method. Consequently need for an apparatus capable of functioning in accord with the proposed method exists.

Summary

A general object of the invention is to provide an apparatus that may be used in grinding optical surfaces that have a progressively varying dioptric curvature.

Yet another object of the invention is to provide an apparatus that may be used in grinding optical surfaces for fields of constant dioptric power as well as for fields of varying dioptric power.

Another object of the invention is to provide an apparatus which may be used in grinding optical surfaces that provide a progressively varying dioptric power with a minimum of perceptible distortion.

Another object is to provide a machine for orienting and manipulating a refractive body with respect to the cutting surface of the lens grinding implement and which has simple movements and adjustable mechanisms that are readily understood and manipulated by lens grinding technicians.

Yet a further object is to provide a machine for orienting and manipulating a refractive body with respect to a cutting surface and which has simple movements and adjustable mechanisms that involve principles which are adaptable to usage in more fully automatic machinery capable of use in orienting and manipulating such bodies.

Yet another object is to provide a lens holder and means for mounting and moving the holder with respect to the abrasive surface of a grinding implement and which enables an optical surface to be developed by a process involving the formation of a plurality of narrow parallel cuts in the surface of the refractive body.

The apparatus has an abrading element and a carriage supported lens blank holder which, in accord with the invention, is mounted on the carriage for pivotal movement about one axis and by means which, with the holder, is rotatably adjustable about another axis. This enables a surface area to be developed by a plurality of cuts in the surface of the blank held by the holder and in which each cut is made during a pivotal movement of the holder while enabling the holder between the cuts to be rotatably adjusted so as to reorient the blank relative to the cutting surface preparatory for the succeeding cut. This reorientation of the blank by rotation of the holder enables the various cuts to be made in planes which are parallel to each other. In accord with the invention, provisions are also made for adjusting the location of the blank along an axis of the holder and for also adjusting the location of the carriage relative to the cutting surface. The adjustable mechanisms involved here permit variations in the radii of curvatures at the surfaces of the cuts and are such that the centers of the curvatures always fall on a common axis. In accord with one aspect of the invention rotatable components are provided for each adjustable mechanism and which are manipulated in making the various adjustments. In the preferred embodiment the manipulations of the rotatable components are made by hand and suitable scales are provided to facilitate proper manipulation of the rotatable components to secure the desired adjustments. When greater automation is desired, however, it will be apparent that suitable automatic controls components may be coupled to the rotatable elements of the adjusting mechanisms.

Brief description the drawings

The novel features which are believed to be characteristic of this invention are set forth with particularity in the appended claims. The invention itself, however, both as to its organization and method of operation, together with further objects and advantages thereof, may best be understood by reference to the description which follows, taken in connection with the accompanying drawings in which:

Figure 1:
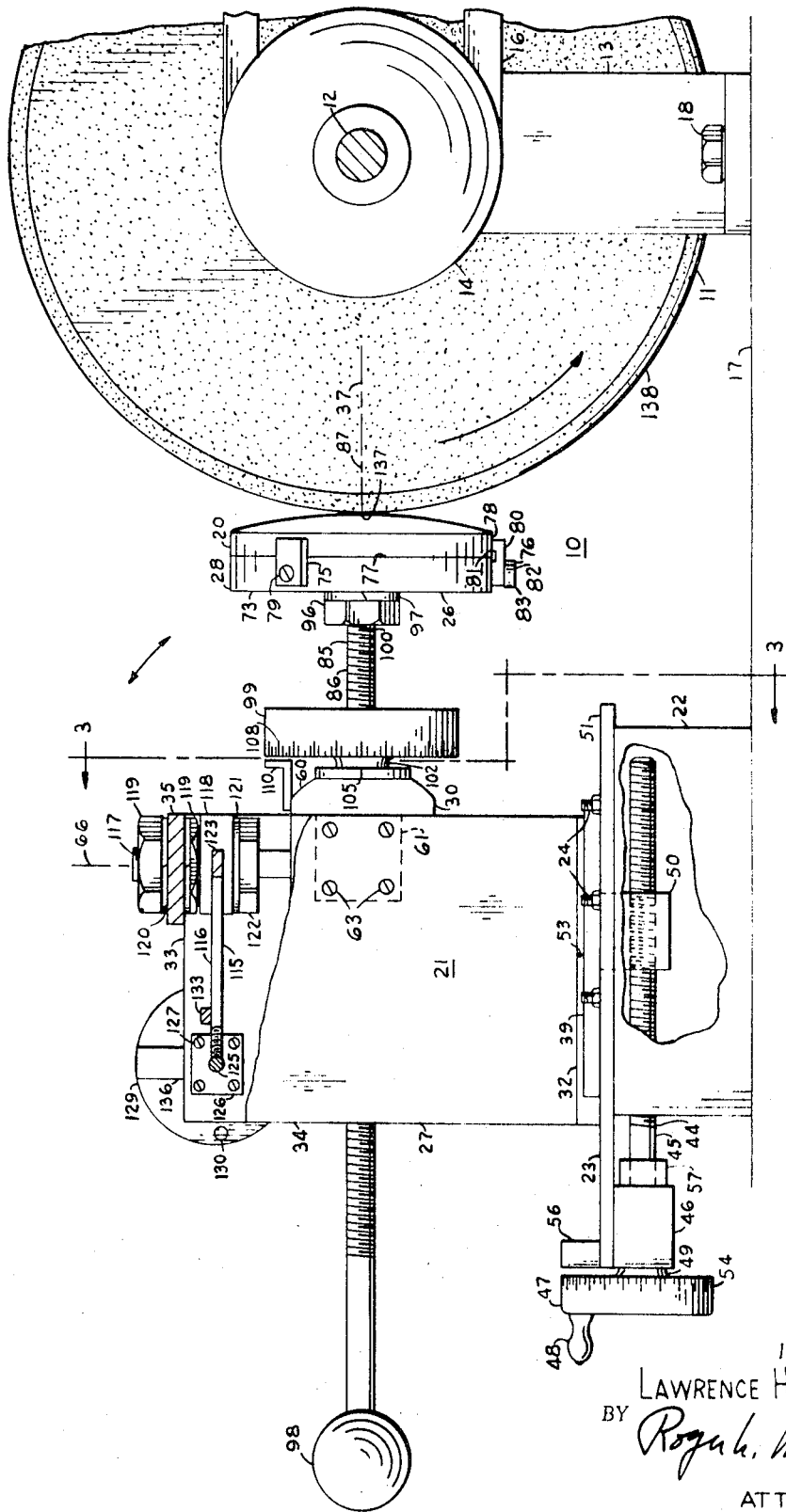
FIG. 1 is a side elevational view of an apparatus embodying the invention with certain parts broken away and others removed.
Figure 2:
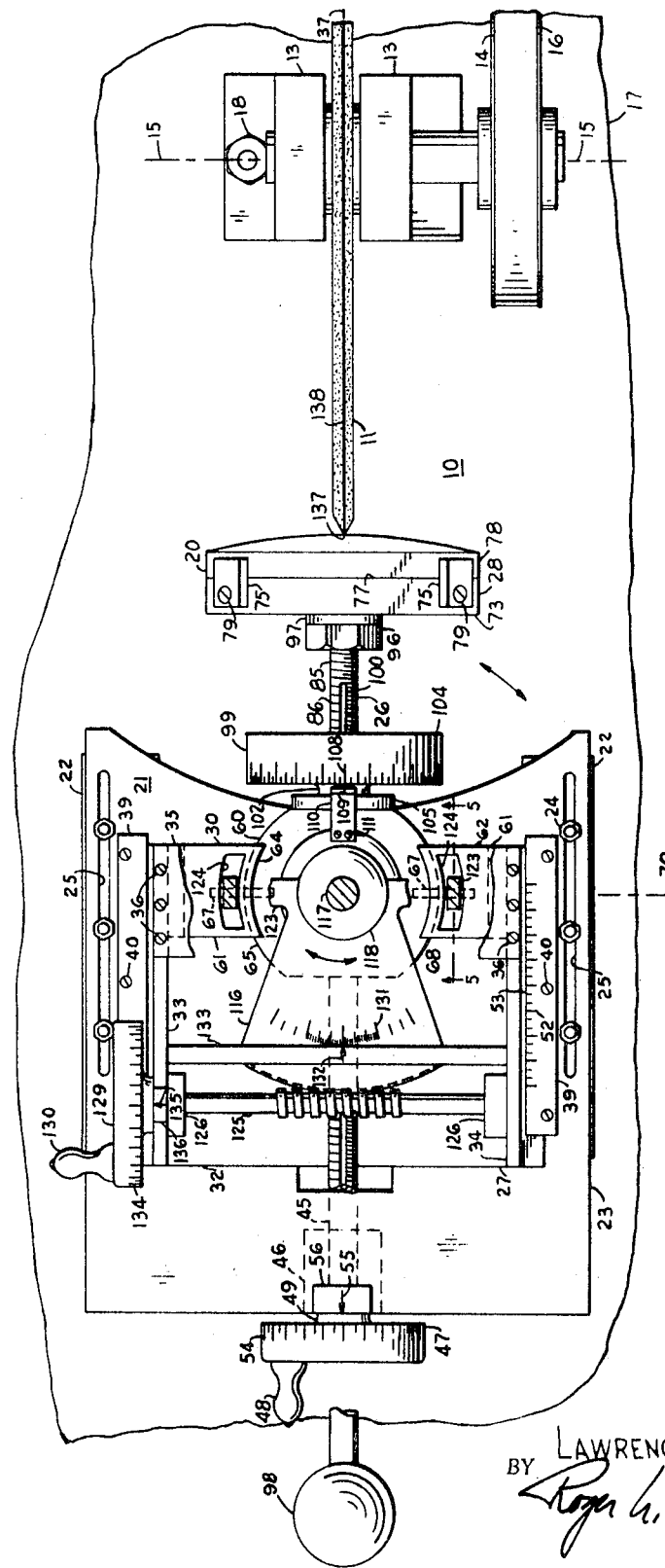
FIG. 2 is a top plan view of the apparatus seen in FIG. 1 with certain parts broken away and others removed.
Figure 3:
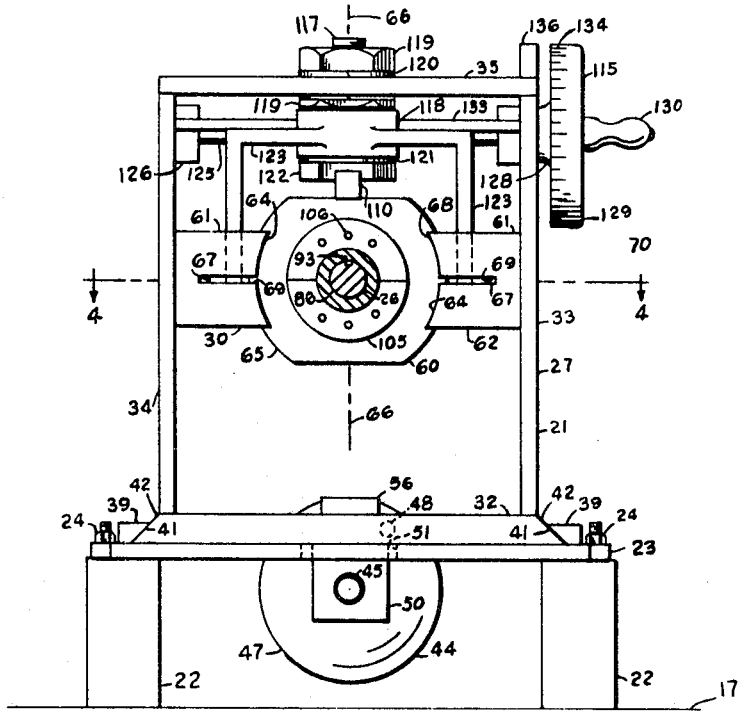
FIG. 3 is a vertical section through components of the machine used in manipulating the lens blank as seen along the lines 3—3 of FIG. 1.
Figure 4:
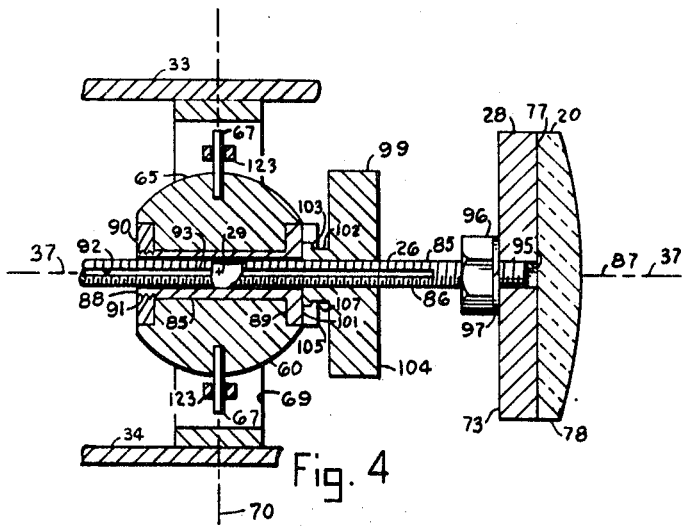
FIG. 4 is a horizontal section through the principal parts of the machine as taken generally along the lines 4—4 of FIG. 3.

FIG. 6 is a plan view showing the optical surface on the convex side of an ophthalmic lens having separate fields of constant dioptric power and which are separated by an intermediate field having a dioptric power which progressively varies between those of the separated fields, certain lines being added to the drawing to diagrammatically illustrate how the optical surface areas for the respective fields are developed;

FIG. 7 is a section through the lens along the lines 7—7 of FIG. 6 through the plane of the optical axis and vertical meridian and further illustrates diagrammatically how the optical surface is generated; and FIG. 8 is a horizontal section taken along the lines 8—8 of FIG. 6.

Description of the preferred embodiment

Reference is now made to the drawings and particularly to FIGS. 1 through 5 wherein an apparatus which embodies the concepts of the invention is designated at 10. The apparatus includes an abrasive wheel 11 which is mounted on a shaft 12 that is journaled in bearings carried in spaced supports 13 for the bearings. The shaft 12 carries a pulley 14 at one end, and the grinding wheel 11 is rotatably driven about the horizontal axis 15 of the shaft through a belt 16 drive connection with a suitable motor, not shown. The supports 13 are mounted on a suitable rigid platform or table 17 and secured in place by bolts designated at 18.

The machine used in manipulating the lens blanks 20 against the wheel 11 during the process of grinding the optical surface thereon is designated at 21. Machine 21 has a pair of support blocks 22 which are spaced apart and fixed to the table 17. Blocks 22 support a flat metal plate 23 spacedly above the table 17, and the plate 23 is rigidly fastened to the blocks by bolt type fasteners 24.

Plate 23 provides a rigid base on which the carriage is slidably movable, and the bolts extend through suitable slots 25 in plate 23 and which enable minor adjustments in the position of the base plate on the blocks to be made when the need arises.

Machine 21 has a carriage 27 and a lens holder 26 that is supported on the carriage by means of a mount designated at 30. The carriage 27 has a flat metal plate 32 which is arranged horizontally and rests on the base plate 23. Plate 32 carries vertically arranged flat rectangular metal side pieces 33 and 34 and these side pieces 33 and 34 are rigidly fastened to the plate 32 of the carriage. At the top of the carriage, the side pieces 33 and 34 are rigidly spaced and interconnected by an elongated transversely extending plate 35 that is fastened to the side pieces 33 and 34 of the carriage by metal screws 36.

As supported on the base plate 23, carriage 27 is arranged for movement toward and away from the wheel 11 along a horizontal reference axis 37 which is perpendicular to the axis 15 of rotation for shaft 12 and which extends through a center point 29 for certain movements of the holder 26.

Lateral movement of the carriage is prevented by elongated guide rails 39 which are fastened to the base plate 23 by screw elements 40. These rails 39 are equipped with inclined inside edges 41, and the opposite side edges 42 of the carriage plate 32 are matchingly inclined to provide a sliding fit. The keystone type arrangement in the carriage plate 32 permits the carriage to slide on the surface of base plate 23 along the reference axis 37 while the rails prevent lateral displacements of the carriage from the axis.

The location of the carriage 27 along the axis 37 is established by a screw type mechanism 44 which can be manipulated to move and thus adjust the location of the carriage 27 along axis 37 as the need arises. The rear end of screw 45 is journaled in the block 46 that is fixed to the underside of the base plate 23 and has a cylindrical wheel element 47 that is equipped with a handle 48 so that the screw can be rotated by hand in moving and adjusting the location of the carriage 27 along its axis of movement. The hub 49 of wheel 47 bears against the rear side of block 46, and screw 45 has a sleeve 57 fixed thereto at the front side of the block so as to prevent axial movement of the screw 45 with respect to block 46.

Screw 45 is arranged in parallel with the reference axis 37 and at its front end is threaded in the block 50 which is fixed to the underside of plate 32. Base plate 23 has an elongated slot 51 to accommodate the movement of the carriage block 50 as the carriage is adjusted in its position along axis 37.

The location of carriage 27 along axis 37 may be determined by the lens grinder in the embodiment illustrated by reference to a suitable scale 52 that is marked on the rail 39 at the right side of the carriage and indexed with respect to a mark 53 on plate 32 adjacent thereto. The determination is further refined by reference to another scale 54 marked on the perimeter of wheel 47 and indexed with respect to an arrow 55 carried on block 56 appropriately mounted at the rear edge of plate 23. Scales 52 and 54 are calibrated to be read together in making the determination with the latter being read to indicate increments of movement of mark 53 between adjacent markings on scale 52.

The mount 30 for the blank holder 26 is of the ball and socket type in the illustration and is adapted and arranged to establish a center for certain movement of the holder which are involved in orienting the holder with respect to the wheel 11 and in manipulating the lens 20 into contact with the surface of the wheel.

The spherical ball component 60 has sectors removed at the front and rear of the ball as well as at the top and bottom of the ball as is obvious from a consideration of the drawings and is supported in the space between the side pieces 33 and 34 of the carriage 27 by a pair of members 61 that serve as the socket forming component 62 of the mount. These members are fastened to the adjacent side pieces 33 and 34 by metal screws 63 and are provided with confronting spherical surfaces 64 which form the socket and match the exterior surface contour 65 of the ball component. The center 29 of the ball is located on the axis 37 of movement for the carriage and the ball and socket arrangement establishes a vertical axis 66 for limited rotational movement of the holder 26 and which is at all times perpendicular to the reference axis 37 at the center of movement of the ball.

Ball 60 has a pair of pins 67 which are coaxially arranged and press fit in suitably aligned holes at the opposite sides of the ball. These pins 67 protrude at the opposite sides of the ball into horizontally arranged slots 69 in members 61 and these slots 69 open into the socket 68 formed by the spherical surfaces 64. The slot arrangement in members 61 is such as to enable the pins 67 to rotate about axis 66 when the ball component is thus moved while nevertheless preventing movement of the pins 67 out of the horizontal plane perpendicular to axis 66 and in which the reference axis 37 is located. Pins 67, as previously indicated, are axially aligned and they serve to establish a pivot axis 70 which intersects the axis 66 of rotation for the holder 26 at the center 29. When the ball is rotatably moved about the vertical axis 66, the angular relation between the reference axis 37 and the axis 70 for pivotal movement of the holder is accordingly changed.

The holder 26 for the body of refractive material has a retainer 28 which includes a flat circular plate 73 that is equipped at the perimeter with a pair of spaced elements 75 which provide a base for centering the blank on the support plate 73. Plate 73 is also equipped with a finger manipulatable clamp 76 which is arranged to hold the lens blank 20 against elements 75 at the front face 77 of plate 73. Elements 75 are rectangular plate like elements that lap the edge 78 of the blank 20 at the front of the plate 73 and each is fastened to the perimeter of the plate by a metal screw 79. The clamping component 76 of the retainer comprises a slotted plate element 80 in common usage and which provides a foot 81 that firmly presses against the edge 78 of the blank when the blank is secured in place. A screw 82 threaded in the plate 73 and having a knurled head 83 is used in forcing the foot against the blank edge 78 and is manipulatable to release the blank from the retainer 28.

The lens blank retainer 28 is connected to the ball component 60 of the mount by means of a screw type mechanism 85 that serves as a component of the holder which is manipulatable to adjust the offset location of the blank with respect to the center 29 of movement for the holder. The mechanism 85 has an elongated screw element 86 which extends through the ball 60 and which establishes an axis that is fixed with respect to the ball and along which the retainer can be moved in adjusting the location of the blank along the axis. This axis 87 projects through the center 29 of movement for the ball and is at all times normal at the center 29 to the axis 70 for pivotal movement of the holder.

The ball 60 has an elongated sleeve 88 that extends through an appropriate opening through the ball and the sleeve 88 is equipped with a radially extending flange 89 at the front end of the ball. The sleeve is clamped in place by a nut 90 that engages exterior threads 91 at the rear end of the sleeve. The screw element 86 extends through sleeve 88 and is axially slidable therein. The screw 86, however, is equipped with a keyway 92 and the sleeve 88 has an internal key 93 which engages the screw 86 in the keyway 92. Key 93 is an integral element of sleeve 88 and thus prevents the screw 86 from rotating with respect to the sleeve of the ball.

The circular plate 73 of the retainer 28 has a centerly located threaded opening 95 and is screwed on the front end of screw 86 and secured in place by a nut 96 and lock washer 97. The rear end of the screw 86 has an attached ball element 98 that provides a handle which can be manipulated by a lens grinding technician to pivot the holder 26 about the pivot axis 70 during use of the machine.

The flange 89 and nut 90 fit in recesses at the front and rear sides of the ball, and a wheel 99 which threadedly engages the threads 100 of screw 86 is rotatably mounted at the front face 101 of flange 89. The hub 102 of wheel 99 has a radially extending flange 103 which is an integral part of the wheel and which is rearwardly offset from the body 104 of the wheel. Flange 103 is slidably retained against the face 101 of flange 89 by a split ring retainer 105. This retainer 105 is fastened to the sleeve flange 89 by screws 106 and is provided with an inwardly projecting flange 107 which laps the front of the wheel flange 103. When the wheel 99 is rotatably manipulated, the screw 86 is moved axially and this moves the retainer 28 toward or away from the center 29 along axis 87 depending on the direction of rotary movement of wheel 99.

Wheel 99 is marked with a scale 108 at its perimeter and this scale is indexed by reference to a mark 109 carried on an L-shaped lug 110 that is fixed to the upper face of ball 60 by screws 111. The wheel and screw arrangement of assembly 85 is preferably such that the retainer 28 moves along the axis 87 with each revolution of wheel 99 a distance which is equal to that which the carriage moves along axis 37 with each revolution of wheel 47.

The blank holding assembly 26 can be rotated about the vertical axis 66 by another screw type mechanism 115 that includes a worm gear segment 116. Segment 116 is supported on a pin 117 that is suspended from cross plate 35 at the front of the carriage in coaxial arrangement with the vertical axis 66. Pin 117 extends through the hub 118 of the segment 116 and is clamped to the cross plate 35 by nuts 119 at the upper and lower sides of the plate 35 and which cooperate with a lock washer 120 in fixing the pin 117 to the carriage 27. The hub 118 of the segment rests on a supporting sleeve bearing 121 adjacent the head 122 of pin 117 and is rotatably movable about the axis of the pin.

Figure 5:
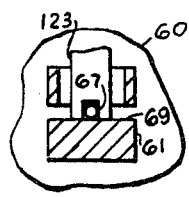
FIG. 5 is a vertical section of a fragment of the machine as seen along the lines 5—5 of FIG. 2.

Mechanism 115 has a pair of arms 123 that project laterally of hub 118 and which are formed integral with the hub so as to rotate therewith. These arms 123 extend over the pivot pins 67 and are bent so that they project downwardly from their respective bends and into engagement wtih the pivot pins 67 of the ball component. The lower ends of the arms 123 are bifurcated and straddle the pins as seen in FIG. 5 so that any rotation of the ball 60 and holder 26 with respect to axis 66 is in accord with the movement of the arm 123 about the axis of pin 117. Suitable arcuate slots 124 which communicate with the slots 69 for the pivot pins are provided in the socket forming members 61 to facilitate the connecting arrangement and the rotational movement of the arms 123.

Gear segment 116 is engaged by a transversely extending worm or screw 125 which, in the illustration, is journaled at its opposite ends in bearings 126. These bearings are located in the space between the carriage side pieces 33 and 34 and are fastened to the pieces by screws 127. The left end of screw 125 extends through piece 33 and is fixed to a hub 128 of a wheel 129 having a handle 130 that can be manipulated by the lens grinding technician to rotate the wheel 129 and thus the screw 125 so as to rotate the gear segment 116 and ultimately the lens holder 26.

Gear segment 116 has a scale 131 marked on its upper face and which is indexed by reference to a mark 132 carried on a transverse bar 133 that is fixed at its opposite ends to the carriage side pieces 33 and 34. Readings from this scale 131 are complimented by readings from a scale 134 marked on the perimeter of wheel 129 and the latter scale is indexed by reference to a mark 135 carried on a block 136 fixed to the upper edge of piece 33 adjacent the wheel. In the preferred embodiment illustrated one revolution of wheel 129 is adapted to rotate the holder one degree about axis 66 and which may be read on scale 131 with scale 134 being calibrated in increments of a degree.

The development through use of the apparatus of a lens having a field of progressively varying dioptric power as well as a field of constant dioptric power is best understood by reference to the lens 140 shown in FIGS. 6, 7, and 8. Lens 140 is depicted as ground from a spherical lens blank having a radius of curvature $Rf$ on the convex side 141 and a radius of curvature $Rb$ on the concave side and which are respectively centered on the optical axis of the blank at $Cf$ and $Cn$. The lens 140 is of a type having distance and near fields 143 and 144, respectively, of constant dioptric power which are separated by an intermediate field 145 of varying dioptric power. The type lens illustrated may be stocked by optical laboratories for addition of prescription formulas to the concave side 142 of the lens.

The optical surface areas 146 and 147 for the intermediate and near fields 145 and 144, respectively, are ground on the convex side 141 of the lens by removing refractive material from the lens blank as seen by reference to the broken line contour 148 of the blank in FIG. 7 and these surface areas 146 and 147 merge along the line 153. This line of merger 153 falls in a horizontal plane which is parallel to the plane common to the optical axis 149 and the horizontal meridian in the lens illustrated, and the optical surface area 146 for the intermediate field 145 merges with the surface area 150 for the distance field along the line 152 of intersect of the common plane with the convex side 141 of the lens.

The radius of curvature $Rn$ of the optical surface area 147 for the near field 144 of lens 140 is the same in all meridians and is centered at $Cn$ on the optical axis. The radius of curvature of the optical surface area 146 for the intermediate field, however, varies progressively between the lines of merger 152 and 153. In the vertical plane of the optical axis, and which is orthogonal to the plane common to the horizontal meridian and the axis 149, the radius of curvature progressively decreases along the principal axis of the intermediate field from $Rf$ at the vertex 151 of the convex side to $Rn$ at the point 154 of intersection of the vertical plane with the line 153 of merger of the surface areas 146 and 147. Along the line 151–154, the center of curvature has a straight line locus which progressively advances from $Cf$ to $Cn$ along the optical axis 149. In horizontal planes parallel to the horizontal plane common to the optical axis and the horizontal meridian, the radius of curvature along the line of intersection of each plane with the surface area 146 is the same as at the intersection of the plane with line 151–154. This is best seen by reference to the horizontal section through the lens 140 as seen in FIG. 8 and wherein the radius of curvature along the line of intersection of the surface with the horizontal plane of the view is the same as at the point of intersection 155 of the plane of the view with line 151–154.

In setting up the apparatus 10 to develop the lens 140, the blank is first mounted on the retainer 28 so that the axis 149 of the blank is coincident with the axis 87 of screw mechanism 85. The carriage location is then adjusted by rotating wheel 47 of mechanism 44 in a manner such as to establish a distance between the center 29 of movement for the holder and the point of contact 137 with the wheel 11 on axis 37 which corresponds to the spherical radius $Rf$ for the convex side of the blank. This can be done through combined readings on scales 52 and 54. Next in the setting up process, wheel 99 of mechanism 85 is rotatably moved so as to establish a distance between the center 29 and the vertex 151 which corresponds to the established distance between center 29 and contact point 137. This can be accomplished by orienting the axis 87 of holder 26 into coincidence with axis 37 and by manipulating mechanism 85 to bring the vertex point 151 into contact with the wheel at point 137.

Once the apparatus is thus set up, the wheel 129 of screw mechanism 115 is rotatably moved to rotate the holder 26 about axis 66 and into a position for the first cut across the face of the blank. The amount of rotational movement imparted to the holder will normally be sufficient to move the face of the lens blank about axis 66 an amount which corresponds to the width of the wheel at the point of contact with the blank and thus the contemplated width of the cut. Next wheel 99 of mechanism 85 is rotated to draw the blank toward the center 29 a distance which corresponds to the progressive decrease in the radius of curvature which is contemplated between cuts and wheel 47 is rotated to move the carriage along axis 37 and toward the wheel 11 a distance corresponding to the progressive decrease in radius. Thereafter the assembly 26 is pivotally moved about the pivot axis 70 by manipulating handle 98 so that the blank comes into contact with the wheel 11 and a cut is made across the face of the blank.

The process of adjusting the location of the carriage along the reference axis 37, of adjusting the location of the blank along the axis 87 of the holder, and of rotating the holder about axis 66 is then repeated before each succeeding cut until the distance between the center 29 and point 137 corresponds to the radius of curvature $Rn$ for the surface area 147 for the near field 144. Thereafter this surface area 147 is developed without the need for further adjustments of mechanisms 44 and 85 and by merely adjusting mechanism 115 between each succeeding cut until the surface 147 is developed.

In developing the surface area 146 through use of the apparatus, the surfaces 164 of the narrow cuts have progressively diminishing radii of curvatures indicated as $R1$ through $R7$ and which are respectively centered at $C1$ through $C7$ on the optical axis 149. Adjacent cuts are indicated as merging along the lines 165 and which are shown in the illustration as being much wider than in actual practice. In practice, the width of each cut is normally less than 0.1 millimeter and is preferably of the order of magnitude of about .01 millimeter so as to approach as close as practical a tangential arrangement along the lines of merger 165 of the surface areas 164 of the cuts. Once the surface areas have been developed through use of the apparatus they may be fined and polished to provide optical surfaces.

From the foregoing it is evident that improvement lens that involve a field of progressively varying dioptric power may be developed through use of the apparatus. The embodiment shown is primarily designed for use by lens grinding technicians and involves adjusting mechanisms having simple movements that are readily understood by skilled optical laboratory technicians. By virtue of the simplicity of the movements, it is also apparent that the invention may be easily embodied in more automatic apparatus.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. An apparatus for use in grinding opthalmic lens including a grinding wheel, and a machine for manipulating a refractive body relative to the wheel, said machine comprising a carriage moveable toward and away from said wheel along an axis, a holder for the refractive body carried by and moveable with said carrage, and mounting means supporting said holder on said carriage, said mounting means providing mutually perpendicular axes respectively for pivotal and limited rotational movements of the holder and comprising pivot means rotatably moveable with said holder with respect to one of said axes and establishing the other of said axes.

2. An apparatus for use in grinding opthalmic lens in accord with claim 1 wherein said holder comprises means for retaining the refractive body, and means establishing an axis perpendicular to said other of said axes and having means rotatable to move the retaining means along the axis established thereby.

3. An apparatus for use in grinding opthalmic lens in accord with claim 1 wherein said machine comprises means rotatable to move the carriage along the axis of movement thereof, means carried by the carriage and rotatable to rotate said holder with respect to said one of said axes, and means mainpulatable to pivotally move said holder with respect to said other of said axes.

4. An apparatus for use in grinding opthalmic lens in accord with claim 1 wherein said axis is perpendicular to said one of said axes; wherein said holder comprises means for retaining the refractive body, and means establishing an axis perpendicular to said other of said axes and having means rotatable to precisely adjust the location of the retaining means along the axis establish thereby; and wherein said machine comprises means rotatable to precisely adjust the location of the carriage along the axis of movement thereof, means carried by the carriage and rotatable to rotate said holder and precisely adjust the angular relation between the axis of movement of the carriage and said other of said axes, and means manipulatable to pivotally move said holder with respect to said other of said axes.

5. A machine for use in manipulating a refractive body with respect to an abrasive surface comprising carriage means moveable along a first axis, a holder for the refractive body having a retainer for securing the body to the holder and which is moveable along a second axis, a mount supporting the holder on the carriage and establishing a third axis for limited rotational movement of the holder on the carriage, and pivot means establishing a fourth axis for pivotal movement of the holder on the carraige, said second axis and said fourth axis being fixed with respect to the holder and mutually perpendicular at a center of movement for the holder on the carriage, said third axis established by the mount being perpendicular to said fourth axis at said center, and said first axis being perpendicular to said third axis at said center.

6. A machine for use in manipulating a refractive body with respect to an abrasive surface in accord with claim 5 further comprising a first mechanism connected to the carriage means for adjusting the location of the carriage means along said first axis including means rotatable to move said carriage means along said first axis and having indexed scale means for use in ascertaining adjustments in the location of the carriage means along said first axis, a second mechanism constituting a component of the holder for adjusting the location of the retainer along said second axis including means rotatable to move said retainer along said second axis and having indexed scale means for use in ascertaining adjustments in the location of the retainer along said second axis, and a third mechanism carried by the carriage means and coupled to the holder for adjusting the angular relation between said fourth axis and said first axis and including means rotatable to rotate said holder with respect to said third axis and having indexed scale means for use in ascertaining adjustments in said angular relation, said holder having means manipulatable to pivot said holder with respect to said fourth axis.

7. A machine for use in manipulating a refractive body with respect to an abrasive surface comprising a holder for the refractive body having a retainer for securing the body to the holder, ball means having a center, a first mechanism secured to the retainer having means manipulatable to adjust the location of the retainer along a first axis established by the mechanism and extending through said center, and pivot means establishing a second axis normal to said first axis at said center for pivotal movement of the holder; said machine further comprising a carriage moveable along a third axis extending through said center, a second mechanism connected to the carriage having means manipulatable to adjust the location of the carriage along said third axis, and means mounting said holder on said carriage for movement therewith, the mounting means comprising socket forming means fastened to the carriage and engaging said ball means, said socket forming means being adapted and arranged to establish a fourth axis extending through said center for limited rotational movement of the holder, said socket forming means having means limiting rotational movement of said pivot means to a plane normal to said fourth axis at said center; and said machine further comprising a third mechanism mounted on the carriage and engaging said pivot means having means manipulatable to adjust the angular relation between said first axis and said third axis.

8. A machine for use in manipulating a refractive body with respect to an abrasive surface in accord with claim 7 wherein the manipulatable means of the first mechanism has scale means for use in ascertaining the location of the retainer along said first axis, wherein the manipulatable means of the second mechanism has scale means for use in ascertaining the location of the carriage along said third axis, and wherein the manipulatable means of the third mechanism has scale means for use in ascertaining the angular relation between said first axis and said third axis.

9. An apparatus for use in grinding opthalmic lens comprising a holder for a refractive body to be ground and which is rotatably moveable with respect to one axis, said holder having a retainer securing the body to the holder; said apparatus further comprising pivot means rotatable with the holder and providing a second axis for pivotal movement of the holder; said second axis being perpendicular to said first axis; said apparatus further comprising carriage means moveable along a third axis and supporting the holder for movement therewith along said third axis, said holder having means manipulatable to move the retainer along a fourth axis extending through the intersect of said first axis and said second axis and being rotatably and pivotally moveable with the holder.

10. A machine for use in manipulating a refractive body with respect to a grinding wheel including a carriage which is moveable toward and away from the wheel along a first axis, a holder for the refractive body and which is mounted on the carriage and moveable along said first axis therewith, and a mount carried by the carriage and supporting the holder thereon, said mount comprising a component having a center located on said first axis, said holder comprising a retainer for releasably fastening a refractive body to the holder, and a screw mechanism connected to the component and to the retainer and establishing a second axis extending through said center and along which the retainer is moveable, and said screw mcehanism having means manipulatable to move and thereby adjust the location of the retainer along said second axis; said mount further comprising means engaging said component and establishing a third axis normal to said first axis and extending through said center, said holder being rotatable within limits and with respect to said third axis; said machine further including pivot means engaging said component and establishing a pivot axis for pivotal movement of the holder and which extends through said center, a screw mechanism carried by the carriage and having means manipulatable to rotate said pivot means and said holder with respect to said third axis, and means restricting rotational movement of the pivot means to a plane perpendicular to said third axis.

References Cited

UNITED STATES PATENTS

| | | | |
|---|---|---|---|
| 1,140,421 | 5/1915 | Wall et al. | 51—96 |
| 1,475,626 | 11/1923 | Galeski | 51—96 |
| 3,012,379 | 12/1961 | Kuhlman | 51—96 X |

LESTER M. SWINGLE, Primary Examiner

U.S. Cl. X.R.

51—284